US011643602B2

(12) United States Patent
Quanci et al.

(10) Patent No.: US 11,643,602 B2
(45) Date of Patent: *May 9, 2023

(54) DECARBONIZATION OF COKE OVENS, AND ASSOCIATED SYSTEMS AND METHODS

(71) Applicant: SUNCOKE TECHNOLOGY AND DEVELOPMENT LLC, Lisle, IL (US)

(72) Inventors: John Francis Quanci, Haddonfield, NJ (US); Daniel C. Charles, Bakerville, IL (US); Gary Dean West, Lisle, IL (US); Sharla Evatt, Lisle, IL (US); Mark Anthony Ball, Richlands, VA (US); Jason Francis Crum, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/321,857

(22) Filed: May 17, 2021

(65) Prior Publication Data
US 2022/0106527 A1 Apr. 7, 2022

Related U.S. Application Data

(63) Continuation of application No. 16/729,057, filed on Dec. 27, 2019, now Pat. No. 11,021,655.
(Continued)

(51) Int. Cl.
*C10B 43/12* (2006.01)
*C10B 45/00* (2006.01)

(52) U.S. Cl.
CPC .............. *C10B 43/12* (2013.01); *C10B 45/00* (2013.01)

(58) Field of Classification Search
USPC .......................... 201/2, 1, 41; 202/241, 248
See application file for complete search history.

(56) References Cited

U.S. PATENT DOCUMENTS

| 425,797 A | 4/1890 | Hunt |
| 469,868 A | 3/1892 | Osbourn |
| (Continued) | | |

FOREIGN PATENT DOCUMENTS

| CA | 1172895 | 8/1984 |
| CA | 2775992 | 5/2011 |
| (Continued) | | |

OTHER PUBLICATIONS

U.S. Appl. No. 17/584,672, filed Jan. 26, 2022, Quanci et al.
(Continued)

*Primary Examiner* — Ellen M McAvoy
(74) *Attorney, Agent, or Firm* — Perkins Coie LLP

(57) ABSTRACT

Systems and methods for removing carbonaceous clinker material from a coke oven are described. A coke oven can be provided including an oven floor, coke, and clinker material deposited on the oven floor. After a temperature of the coke oven has reached a first temperature (e.g., after heating coal in the oven to produce coke), the method includes increasing the temperature of the coke oven to a second temperature that is higher than the first temperature for a predetermined amount of time. After the predetermined amount of time, the temperature is reduced to a third temperature that is lower than the first temperature.

20 Claims, 9 Drawing Sheets

Related U.S. Application Data

(60) Provisional application No. 62/786,299, filed on Dec. 28, 2018.

(56) References Cited

U.S. PATENT DOCUMENTS

| | | |
|---|---|---|
| 760,372 A | 5/1904 | Beam |
| 845,719 A | 2/1907 | Schniewind |
| 875,989 A | 1/1908 | Garner |
| 976,580 A | 7/1909 | Krause |
| 1,140,798 A | 5/1915 | Carpenter |
| 1,378,782 A | 5/1921 | Griffin |
| 1,424,777 A | 8/1922 | Schondeling |
| 1,429,346 A | 9/1922 | Horn |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,895,202 A | 1/1933 | Montgomery |
| 1,947,499 A | 2/1934 | Schrader et al. |
| 1,955,962 A | 4/1934 | Jones |
| 1,979,507 A | 11/1934 | Underwood |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,283 A | 1/1944 | Vladu |
| 2,340,981 A | 2/1944 | Otto |
| 2,394,173 A | 2/1946 | Harris et al. |
| 2,424,012 A | 7/1947 | Bangham et al. |
| 2,486,199 A | 10/1949 | Nier |
| 2,609,948 A | 9/1952 | Laveley |
| 2,641,575 A | 6/1953 | Otto |
| 2,649,978 A | 8/1953 | Smith |
| 2,667,185 A | 1/1954 | Beavers |
| 2,723,725 A | 11/1955 | Keiffer |
| 2,756,842 A | 7/1956 | Chamberlin et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 2,968,083 A | 1/1961 | Lentz et al. |
| 3,015,893 A | 1/1962 | McCreary |
| 3,026,715 A | 3/1962 | Briggs |
| 3,033,764 A | 5/1962 | Hannes |
| 3,175,961 A | 3/1965 | Samson |
| 3,199,135 A | 8/1965 | Trucker |
| 3,224,805 A | 12/1965 | Clyatt |
| 3,259,551 A | 7/1966 | Thompson |
| 3,265,044 A | 8/1966 | Juchtern |
| 3,267,913 A | 8/1966 | Jakob |
| 3,327,521 A | 6/1967 | Briggs |
| 3,342,990 A | 9/1967 | Barrington et al. |
| 3,444,046 A | 5/1969 | Harlow |
| 3,444,047 A | 5/1969 | Wilde |
| 3,448,012 A | 6/1969 | Allred |
| 3,453,839 A | 7/1969 | Sabin |
| 3,462,345 A | 8/1969 | Kernan |
| 3,511,030 A | 5/1970 | Brown et al. |
| 3,542,650 A | 11/1970 | Kulakov |
| 3,545,470 A | 12/1970 | Paton |
| 3,587,198 A | 6/1971 | Hensel |
| 3,591,827 A | 7/1971 | Hall |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 10/1974 | Pries |
| 3,839,156 A | 10/1974 | Jakobie et al. |
| 3,844,900 A | 10/1974 | Schulte |
| 3,857,758 A | 12/1974 | Mole |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,979,870 A | 9/1976 | Moore |
| 3,984,289 A | 10/1976 | Sustarsic et al. |
| 3,990,948 A | 11/1976 | Lindgren |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,065,059 A | 12/1977 | Jablin |
| 4,067,462 A | 1/1978 | Thompson |
| 4,077,848 A | 3/1978 | Grainer et al. |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,100,491 A | 7/1978 | Newman, Jr. et al. |
| 4,100,889 A | 7/1978 | Chayes |
| 4,111,757 A | 9/1978 | Carimboli |
| 4,124,450 A | 11/1978 | MacDonald |
| 4,133,720 A | 1/1979 | Franzer et al. |
| 4,135,948 A | 1/1979 | Mertens et al. |
| 4,141,796 A | 2/1979 | Clark et al. |
| 4,143,104 A | 3/1979 | van Konijnenburg et al. |
| 4,145,195 A | 3/1979 | Knappstein et al. |
| 4,147,230 A | 4/1979 | Ormond et al. |
| 4,162,546 A | 7/1979 | Shortell et al. |
| 4,176,013 A | 11/1979 | Garthus et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,226,113 A | 10/1980 | Pelletier et al. |
| 4,230,498 A | 10/1980 | Ruecki |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |

(56) References Cited

U.S. PATENT DOCUMENTS

| | | |
|---|---|---|
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,316,435 A | 2/1982 | Nagamatsu et al. |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,406,619 A | 9/1983 | Oldengott |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,921,483 A | 5/1990 | Wijay et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,603,810 A | 2/1997 | Michler |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A | 1/1998 | Reinke et al. |
| 5,715,962 A | 2/1998 | McDonnell |
| 5,720,855 A | 2/1998 | Baird |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,003,706 A | 12/1999 | Rosen |
| 6,017,214 A | 1/2000 | Sturgulewski |
| 6,059,932 A | 5/2000 | Sturgulewski |
| 6,139,692 A | 10/2000 | Tamura et al. |
| 6,152,668 A | 11/2000 | Knoch |
| 6,156,688 A | 12/2000 | Ando et al. |
| 6,173,679 B1 | 1/2001 | Bruckner et al. |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,495,268 B1 | 12/2002 | Harth, III et al. |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B1 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,547,377 B2 | 6/2009 | Inamasu et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |

(56) References Cited

U.S. PATENT DOCUMENTS

| | | |
|---|---|---|
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,383,055 B2 | 2/2013 | Palmer |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 * | 6/2015 | Reichelt ............... C10B 21/12 |
| 9,103,234 B2 | 8/2015 | Gu et al. |
| 9,169,439 B2 | 10/2015 | Sarpen et al. |
| 9,193,913 B2 | 11/2015 | Quanci et al. |
| 9,193,915 B2 | 11/2015 | West et al. |
| 9,200,225 B2 | 12/2015 | Barkdoll et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,273,250 B2 | 3/2016 | Choi et al. |
| 9,321,965 B2 | 4/2016 | Barkdoll |
| 9,359,554 B2 | 6/2016 | Quanci et al. |
| 9,404,043 B2 | 8/2016 | Kim |
| 9,463,980 B2 | 10/2016 | Fukada et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,392,563 B2 | 8/2019 | Kim et al. |
| 10,435,042 B1 | 10/2019 | Weymouth |
| 10,526,541 B2 | 1/2020 | West et al. |
| 10,578,521 B1 | 3/2020 | Dinakaran et al. |
| 10,611,965 B2 | 4/2020 | Quanci et al. |
| 10,619,101 B2 | 4/2020 | Quanci et al. |
| 10,732,621 B2 | 8/2020 | Cella et al. |
| 10,877,007 B2 | 12/2020 | Steele et al. |
| 10,883,051 B2 | 1/2021 | Quanci et al. |
| 10,920,148 B2 | 2/2021 | Quanci et al. |
| 10,927,303 B2 | 2/2021 | Choi et al. |
| 10,947,455 B2 | 3/2021 | Quanci et al. |
| 10,968,393 B2 | 4/2021 | West et al. |
| 10,968,395 B2 | 4/2021 | Quanci et al. |
| 10,975,309 B2 | 4/2021 | Quanci et al. |
| 10,975,310 B2 | 4/2021 | Quanci et al. |
| 10,975,311 B2 | 4/2021 | Quanci et al. |
| 11,008,517 B2 | 5/2021 | Chun et al. |
| 11,008,518 B2 | 5/2021 | Quanci et at. |
| 11,021,655 B2 * | 6/2021 | Quanci ............... C10B 43/12 |
| 11,053,444 B2 | 7/2021 | Quanci et al. |
| 11,098,252 B2 | 8/2021 | Quanci et at. |
| 11,117,087 B2 | 9/2021 | Quanci |
| 11,142,699 B2 | 10/2021 | West et al. |
| 11,186,778 B2 | 11/2021 | Crum et al. |
| 11,193,069 B2 | 12/2021 | Quanci et at. |
| 11,214,739 B2 | 1/2022 | Quanci et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2004/0220840 A1 | 11/2004 | Bonissone et al. |
| 2005/0087767 A1 | 4/2005 | Fitzgerald et al. |
| 2005/0096759 A1 | 5/2005 | Benjamin et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 * | 11/2008 | Yamasaki ............... C10B 25/06 202/248 |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0179421 A1 | 7/2012 | Dasgupta |
| 2012/0180133 A1 | 7/2012 | Ai-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0156584 A1 | 6/2014 | Motukuri et al. |
| 2014/0182683 A1 | 7/2014 | Quanci et al. |

(56) References Cited

U.S. PATENT DOCUMENTS

| | | | |
|---|---|---|---|
| 2014/0208997 A1 | 7/2014 | Alferyev et al. | |
| 2014/0224123 A1 | 8/2014 | Walters | |
| 2014/0262726 A1 | 9/2014 | West et al. | |
| 2015/0041304 A1 | 2/2015 | Klim et al. | |
| 2015/0122629 A1 | 5/2015 | Freimuth et al. | |
| 2015/0143908 A1 | 5/2015 | Cetinkaya | |
| 2015/0175433 A1 | 6/2015 | Micka et al. | |
| 2015/0219530 A1 | 8/2015 | Li et al. | |
| 2015/0226499 A1 | 8/2015 | Mikkelsen | |
| 2015/0247092 A1* | 9/2015 | Quanci | C10B 43/10 431/3 |
| 2015/0361347 A1 | 12/2015 | Ball et al. | |
| 2016/0026193 A1 | 1/2016 | Rhodes et al. | |
| 2016/0048139 A1 | 2/2016 | Samples et al. | |
| 2016/0149944 A1 | 5/2016 | Obermeirer et al. | |
| 2016/0154171 A1 | 6/2016 | Kato et al. | |
| 2016/0319198 A1* | 11/2016 | Quanci | C10B 15/02 |
| 2016/0370082 A1 | 12/2016 | Olivo | |
| 2017/0173519 A1 | 6/2017 | Naito | |
| 2017/0182447 A1 | 6/2017 | Sappok et al. | |
| 2017/0183569 A1 | 6/2017 | Quanci et al. | |
| 2017/0226425 A1 | 8/2017 | Kim et al. | |
| 2017/0261417 A1 | 9/2017 | Zhang | |
| 2017/0313943 A1 | 11/2017 | Valdevies | |
| 2017/0352243 A1 | 12/2017 | Quanci et al. | |
| 2018/0340122 A1* | 11/2018 | Crum | F27D 1/1694 |
| 2019/0169503 A1 | 6/2019 | Chun et al. | |
| 2019/0317167 A1 | 10/2019 | LaBorde et al. | |
| 2020/0071190 A1 | 3/2020 | Wiederin et al. | |
| 2020/0139273 A1 | 5/2020 | Badiei | |
| 2020/0173679 A1 | 6/2020 | O'Reilly et al. | |
| 2020/0206669 A1 | 7/2020 | Quanci et at. | |
| 2020/0206683 A1 | 7/2020 | Quanci et at. | |
| 2020/0208058 A1 | 7/2020 | Quanci et at. | |
| 2020/0208059 A1 | 7/2020 | Quanci et at. | |
| 2020/0208060 A1 | 7/2020 | Quanci et at. | |
| 2020/0208063 A1 | 7/2020 | Quanci et at. | |
| 2020/0208833 A1 | 7/2020 | Quanci et at. | |
| 2020/0407641 A1 | 12/2020 | Quanci et al. | |
| 2021/0024828 A1 | 1/2021 | Ball et al. | |
| 2021/0040391 A1 | 2/2021 | Quanci et al. | |
| 2021/0130697 A1 | 5/2021 | Quanci et al. | |
| 2021/0163821 A1 | 6/2021 | Quanci et al. | |
| 2021/0163822 A1 | 6/2021 | Quanci et al. | |
| 2021/0163823 A1 | 6/2021 | Quanci et al. | |
| 2021/0198579 A1 | 7/2021 | Quanci et al. | |
| 2021/0340454 A1 | 11/2021 | Quanci et al. | |
| 2021/0363426 A1 | 11/2021 | West et al. | |
| 2021/0363427 A1 | 11/2021 | Quanci et al. | |
| 2021/0371752 A1 | 12/2021 | Quanci et al. | |
| 2021/0388270 A1 | 12/2021 | Choi et al. | |
| 2022/0056342 A1 | 2/2022 | Quanci et al. | |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 101211495 A | 7/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103913193 A | 7/2014 |
| CN | 203981700 U | 12/2014 |
| CN | 104498059 A | 4/2015 |
| CN | 105137947 A | 12/2015 |
| CN | 105189704 A | 12/2015 |
| CN | 105264448 A | 1/2016 |
| CN | 105467949 A | 4/2016 |
| CN | 106661456 A | 5/2017 |
| CN | 106687564 A | 5/2017 |
| CN | 107445633 A | 12/2017 |
| CN | 100500619 C | 6/2020 |
| DE | 201729 C | 9/1908 |
| DE | 212176 | 7/1909 |
| DE | 1212037 B | 3/1966 |
| DE | 2720688 A1 | 11/1978 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EP | 0126399 A1 | 11/1984 |
| EP | 0208490 A1 | 1/1987 |
| EP | 0903393 A2 | 3/1999 |
| EP | 1538503 A1 | 6/2005 |
| EP | 1860034 A1 | 11/2007 |
| EP | 2295129 A1 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 871094 | 6/1961 |
| GB | 923205 A | 5/1963 |
| JP | S50148405 | 12/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |

(56) References Cited

FOREIGN PATENT DOCUMENTS

| | | |
|---|---|---|
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | H08104875 A | 4/1996 |
| JP | 08127778 | 5/1996 |
| JP | H10273672 A | 10/1998 |
| JP | H11131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003051082 A | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 | 7/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012102302 | 5/2012 |
| JP | 2013006957 A | 1/2013 |
| JP | 2013510910 | 3/2013 |
| JP | 2013189322 A | 9/2013 |
| JP | 2014040502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020040020883 A | 3/2004 |
| KR | 20040107204 A | 12/2004 |
| KR | 20050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 20170103857 A | 9/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2005023649 | 3/2005 |
| WO | WO2005031297 | 4/2005 |
| WO | WO2005115583 | 12/2005 |
| WO | WO2007103649 | 9/2007 |
| WO | WO2008034424 | 3/2008 |
| WO | WO2008105269 | 9/2008 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016086322 | 6/2016 |

OTHER PUBLICATIONS

U.S. Appl. No. 17/532,058, filed Nov. 22, 2021, titled Coke Plant Tunnel Repair and Anchor Distribution.
U.S. Appl. No. 16/729,157, filed Dec. 27, 2019, now U.S. Pat. No. 11,071,935, titled Particulate Detection for Industrial Facilities, and Associated Systems and Methods.
U.S. Appl. No. 16/729,057, filed Dec. 27, 2019, now U.S. Pat. No. 11,021,655, titled Decarbonization of Coke Ovens and Associated Systems and Methods.
U.S. Appl. No. 16/729,212, filed Dec. 27, 2019, now U.S. Pat. No. 11,261,381, titled Heat Recovery Oven Foundation.
U.S. Appl. No. 17/584,672, filed Jan. 26, 2022, titled Heat Recovery Oven Foundation.
U.S. Appl. No. 16/729,219, now U.S. Pat. No. 11,098,252, filed Dec. 27, 2019, titled Spring-Load Heat Recovery Oven System and Method.
U.S. Appl. No. 17/388,874, filed Jul. 29, 2021, titled Spring-Loaded Heat Recovery Oven System and Method.
U.S. Appl. No. 17/306,895, filed May 3, 2021, titled High-Quality Coke Products.
U.S. Appl. No. 17/222,886, filed Apr. 5, 2021, Quanci et al.
U.S. Appl. No. 17/363,701, filed Jun. 30, 2021, Quanci et al.
U.S. Appl. No. 17/388,874, filed Jul. 29, 2021, Quanci et al.
U.S. Appl. No. 17/459,380, filed Aug. 27, 2021, Quanci et al.
U.S. Appl. No. 17/471,491, filed Sep. 10, 2021, West et al.
U.S. Appl. No. 17/521,061, filed Nov. 8, 2021, Crum et al.
U.S. Appl. No. 17/526,477, filed Nov. 15, 2021, Quanci et al.
U.S. Appl. No. 17/532,058, filed Nov. 22, 2021, Quanci et al.
ASTM D5341-99(2010)e1, Standard Test Method for Measuring Coke Reactivity Index (CRI) and Coke Strength After Reaction (CSR), ASTM International, West Conshohocken, PA, 2010.

(56) References Cited

OTHER PUBLICATIONS

Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case #1-24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
Rose, Harold J., "The Selection of Coals for the Manufacture of Coke," American Institute of Mining and Metallurgical Engineers, Feb. 1926, 8 pages.
Waddell, et al., "Heat-Recovery Cokemaking Presentation," Jan. 1999, pp. 1-25.
Walker D N et al, "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.
Yu et al., "Coke Oven Production Technology," Lianoning Science and Technology Press, first edition, Apr. 2014, pp. 356-358.
"Resources and Utilization of Coking Coal in China," Mingxin Shen ed., Chemical Industry Press, first edition, Jan. 2007, pp. 242-243, 247.
Canadian Office Action in Canadian Application No. 3,125,332; dated Aug. 13, 2021; 3 pages.
International Search Reort and Written Opinion for PCT/US2019/068813; dated Apr. 29, 2020; 12 pages.
U.S. Appl. No. 17/736,960, filed May 4, 2022, Quanci et al.
U.S. Appl. No. 17/747,708, filed May 18, 2022, Quanci et al.
U.S. Appl. No. 17/843,164, filed Jun. 17, 2022, Quanci et al.
U.S. Appl. No. 17/947,520, filed Sep. 19, 2022, Quanci et al.
"High Alumina Cement-Manufacture, Characteristics and Uses," TheConstructor.org, https://theconstructor.org/concrete/high-alumina-cement/23686/; 12 pages.
"Refractory Castables," Victas.com, Dec. 28, 2011 (date obtained from WayBack Machine), https://www/vitcas.com/refractory-castables; 5 pages.

* cited by examiner

DECARBONIZATION OF COKE OVENS, AND ASSOCIATED SYSTEMS AND METHODS

CROSS-REFERENCE TO RELATED APPLICATION(S)

This application is a continuation of U.S. patent application Ser. No. 16/729,057, filed Dec. 27, 2019 which claims the benefit of U.S. Provisional Patent Application No. 62/786,299, filed Dec. 28, 2018, both disclosures of which are incorporated herein by reference in their entireties.

TECHNICAL FIELD

The present disclosure relates to the decarbonization of coke ovens.

BACKGROUND

Coke is a solid carbon fuel and carbon source used to melt and reduce iron ore in the production of steel. In one process, known as the "Thompson Coking Process," coke is produced by batch feeding pulverized coal to an oven that is sealed and heated to very high temperatures for approximately forty-eight hours under closely-controlled atmospheric conditions. Coking ovens have been used for many years to convert coal into metallurgical coke. During the coking process, finely crushed coal is heated under controlled temperature conditions to devolatilize the coal and form a fused mass of coke having a predetermined porosity and strength. The coking process also releases hydrocarbon-containing material from the coal under high heat, causing carbonaceous material from the hydrocarbons to be redeposited on surfaces of the coke oven. This build-up of carbon can inhibit the production of coke in the oven and, if left to build up for too long, can cause the oven to fail.

DETAILED DESCRIPTION

The present technology is generally directed to decarbonization of coke ovens. During production of coke from coal, hydrocarbon-containing material is released from the coal under high heat and carbonaceous material from the hydrocarbons is redeposited on surfaces of the coke oven. Embodiments described herein remove the carbonaceous material deposited on the surfaces of the coke oven by physical, chemical, or a combination of physical and chemical means. In some embodiments, a method for removing this deposited material ("clinker") from a coke oven in an industrial facility includes providing a coke oven including an oven floor, coke, and clinker material deposited on the oven floor. While a temperature of the coke oven is a first temperature (e.g., after heating coal in the oven to produce coke), the method includes applying an oxidizing agent to a portion of the clinker material. The temperature of the coke oven is increased to a second temperature that is higher than the first temperature for a predetermined amount of time, before being reduced to a third temperature that is lower than the first temperature.

In some embodiments, a method for removing carbonaceous material from a coke oven in an industrial facility includes removing coke from the coke oven. After removing the coke, the method includes controlling a temperature of the coke oven (a) at a predetermined temperature greater than 1800° F. and (b) for a time period greater than 12 hours, to declinker the clinker material.

In some embodiments, a system for decarbonizing a coke oven comprises a coke oven including an oven floor, sidewalls extending from the oven floor, and a ceiling attached to the sidewalls and extending over the oven floor. The coke oven can also include coverable openings in at least one of the sidewalls or ceiling, and clinker material covering at least a portion of the oven floor. The system further includes a lance having a first portion within the coke oven and a second portion outside the coke oven, where the lance extends through one of the coverable openings and is configured to direct an oxidizing agent toward a portion of the clinker material in the oven.

Other embodiments of the system or method for decarbonizing a coke oven include other variations of the processes described above.

Figure 1A:
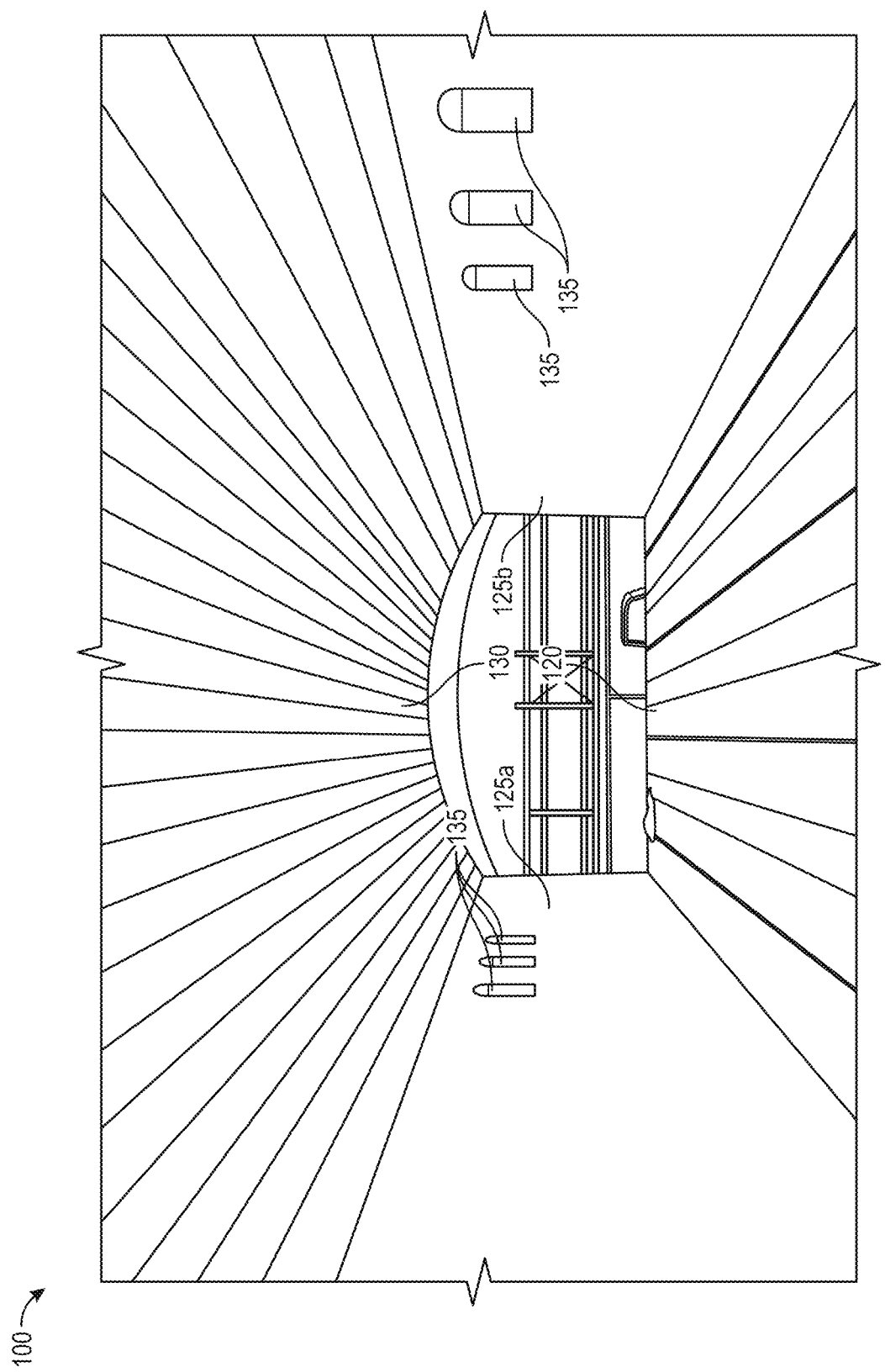
FIG. 1A is an illustration of a coke oven of a coke manufacturing facility.
Figure 1B:
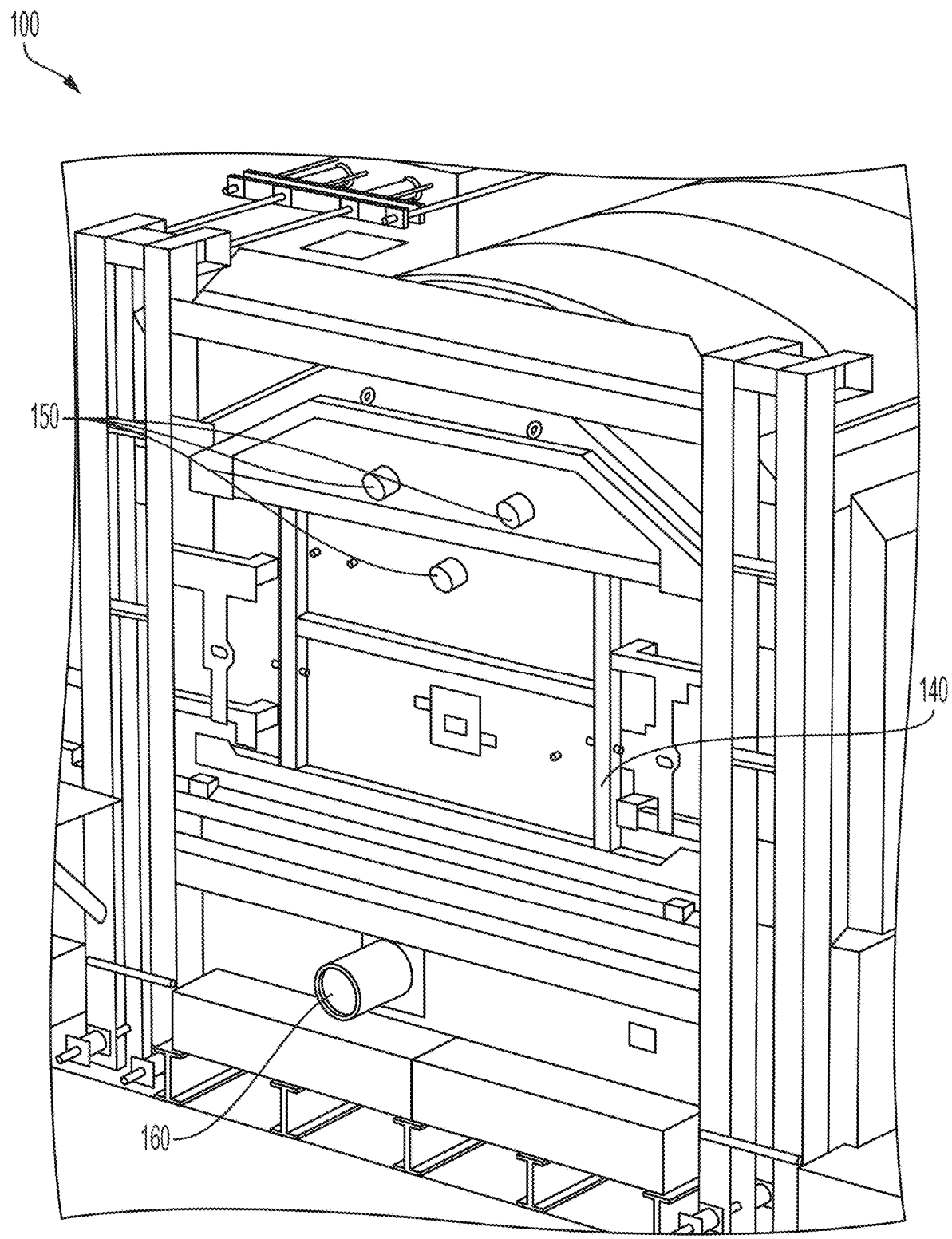
FIG. 1B is an illustration of a coke side door of the coke oven.

FIG. 1A is an illustration of a coke oven 100 of a coke manufacturing facility. The coke oven can be a heat recovery oven, a byproduct oven, or another type of coke oven. As shown in the illustrated embodiment, the coke oven 100 can include an oven floor 120, sidewalls 125a, 125b (collectively referred to as "sidewalls 125") extending upwardly from the oven floor 120, and a ceiling 130 (e.g., a crown) attached to the sidewalls 125 and over the oven floor 120. The coke oven 100 further includes sole flue channels beneath the oven floor 120. As shown in the illustrated embodiment, the coke oven 100 further includes a plurality of downcomers 135 extending along the sidewalls 125 for removing portions of the heated combustion air in the coke oven 100. FIG. 1B is an illustration of a coke side door 140 of the coke oven 100. As shown in the illustrated embodiment, the coke side door 140 includes a plurality of dampers/openings 150, which can be opened as desired to allow ingress of outside air into the coke oven 100. The coke oven 100 further includes a sole flue damper 160, which can be opened as desired to allow ingress of outside air into the sole flue.

Coke is produced in the oven 100 by first loading coal into the oven chamber, heating the coal in an oxygen-depleted environment, driving off the volatile fraction of coal, and then oxidizing the volatile matter within the oven 100 to capture and utilize the heat given off. The coking cycle begins when coal is charged onto the oven floor 120 through a front door. The coal on the oven floor 120 is known as the coal bed. Heat from the oven 100, due to the previous coking cycle, starts a carbonization cycle. Roughly half of the total heat transfer to the coal bed is radiated down onto the top surface of the coal bed from the luminous flame of the coal bed and the crown 130. The remaining approximately half of the heat is transferred to the coal bed by conduction from the oven floor 120, which is convectively heated from the volatilization of gases in the sole flue. In this way, a carbonization process "wave" of plastic flow of the coal particles and formation of high strength cohesive coke proceeds from both the top and bottom boundaries of the coal bed. At the end of the coking cycle, the coal has coked out and has carbonized to produce coke. The coke can be removed from the oven 100 through a rear door opposite the front door using a mechanical extraction system. For example, the coke can be pushed toward the rear door via a coke charging machine. Finally, the coke is quenched and sized before delivery to a user.

Figure 2A:
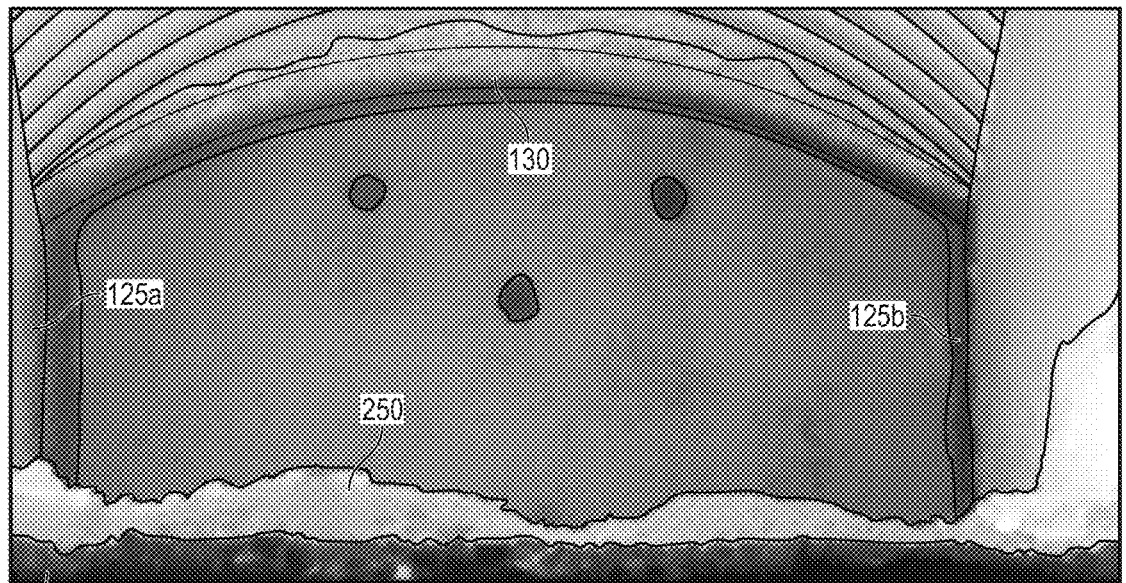
FIGS. 2A and 2B are illustrations of clinker carbonaceous material on a floor of a coke oven.
Figure 2B:
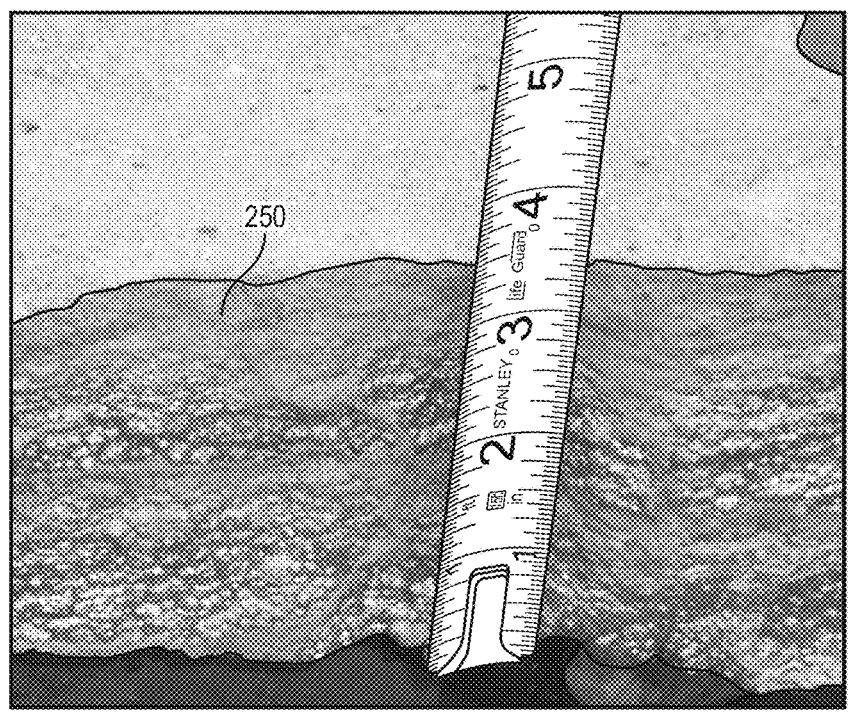

The production of coke from coal causes hydrocarbon-containing material to be released from the coal under high heat, and carbonaceous material from the hydrocarbons is redeposited on surfaces of the coke oven 100, such as the oven floor 120 and/or sidewalls 125. This redeposited material generally comprises carbonaceous material (e.g., approximately 88%) and ash (e.g., approximately 12%), and is commonly referred to as "clinker." Typical buildup of clinker for a coke manufacturing facility can be 2-4 inches per year. FIG. 2A is an illustration of clinker carbonaceous material 250 on the floor 120 of the coke oven 100. As shown in the illustrated embodiment, the clinker material 250 is generally uneven across a width of the oven floor 120. FIG. 2B is another illustration of the clinker carbonaceous material shown in FIG. 2A, showing a measured buildup of the clinker material over time.

The clinker material 250 can create difficulties related to maintaining coke production rates. For example, the clinker material 250 takes up a volume of the oven 100, thereby reducing coke throughput, as well as reduces efficiency of the coke oven 100 due to the loss of heat transfer via the sole flue and irregularities in the outer surface of the clinker material 250. Conventional methods for removing the clinker material 250 include physically removing the clinker material 250 via a pusher ram of a pusher charger machine (PCM). Removing the clinker material 250 in such a manner can damage the pusher ram and decrease its life, while also causing physical stresses and damage on the oven floor. To mitigate the harm caused by clinker build-up, embodiments of the technology described herein remove clinker material using physical means, chemical means, or a combination of physical and chemical means.

Figure 3A:
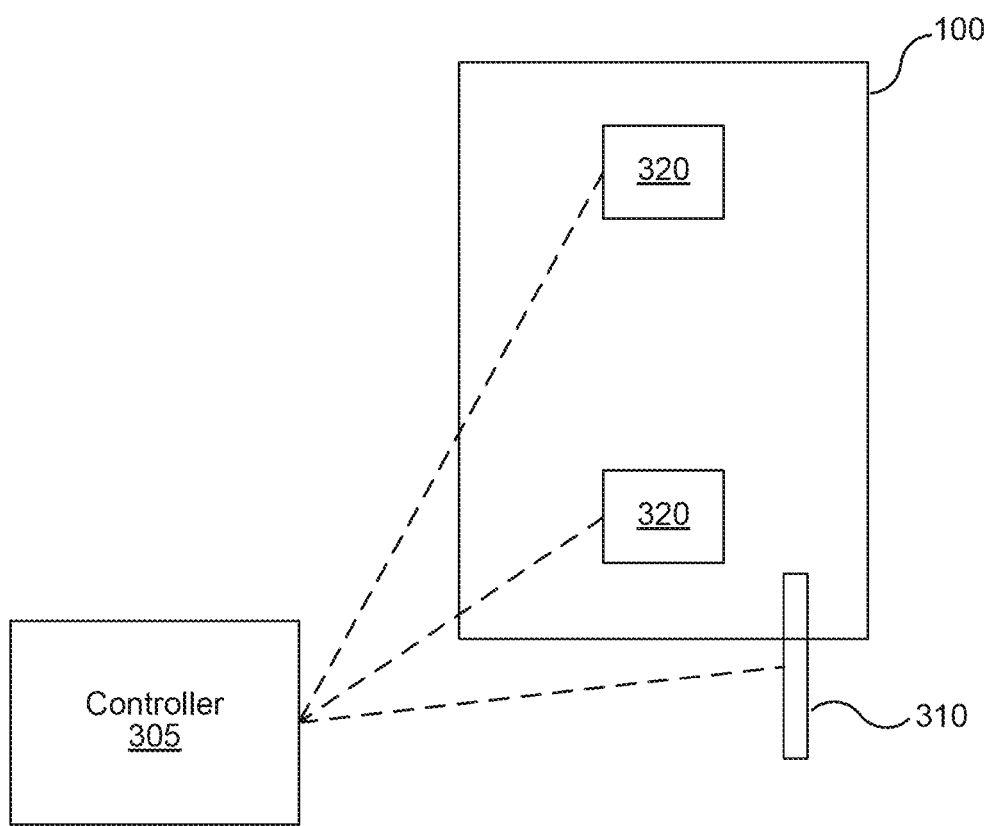
FIG. 3A is a block diagram illustrating components of one embodiment of a system for removing clinker material from a coke oven.

FIG. 3A is a block diagram illustrating components of one embodiment of a system for removing clinker material from a coke oven. As shown in FIG. 3A, the system can include a controller 305 communicatively coupled to a lance 310 and one or more temperature sensors 320 inside of an oven 100. The controller 305 can communicate with the lance 310 and/or temperature sensors 320 by any of a variety of types of wired or wireless communications.

The controller 305 can comprise one or more computing devices configured to control components of the oven 100. The controller 305 can be remotely operable, enabling an operator of an industrial facility including the oven 100 to control temperature of the coke oven from a remote location. The controller 305 can, in some embodiments, be part of a control system used to control other aspects of the facility in addition to temperature of the oven, such as activating and controlling the PCM. Many embodiments of the controller 305 may take the form of computer-executable instructions, including routines executed by a programmable computer. The controller 305 may, for example, also include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured or constructed to perform one or more of the computer-executable instructions described below. Accordingly, the terms "controller" and "control system" as generally used herein refer to any data processor. Information handled by these computers can be presented at any suitable display medium, including a CRT display or LCD. The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

The temperature sensors 320 measure a temperature in the coke oven 100. The temperature sensors 320 may include any of a variety of types of sensors capable of measuring the oven temperature, such as thermocouples, infrared sensors, or resistance temperature detectors. The sensors 320 may be positioned to measure the temperature at various locations in the oven, such as at the crown of the coke oven or on the floor of the oven. The temperature sensors 320 output signals indicative of a temperature in the coke oven 100. The controller 305 can receive the temperature signals from the temperature sensors 320 and regulate the temperature in the oven based on the signals.

The coke oven 100 also includes one or more lances 310 that can be controlled by the controller 305. Each lance 310 directs an oxidizing agent (e.g., oxygen or air) toward clinker material in the coke oven 100. In some embodiments, the lance 310 can be inserted into the coke oven via the openings of the coke oven, including the dampers of the coke side door and/or push side door. Accordingly, the lance 310 can include a first portion outside the oven and a second portion inside the oven. In some embodiments, the lance 310 can be inserted through an opening in the crown of the coke oven. The lance 310 can be lined with refractory material, and can include a single end or multiple ends facing toward the clinker material. The lance 310 can be particularly beneficial for directing the oxidizing agent toward areas of the oven that often do not receive sufficient oxygen to burn clinker material in that area. For example, portions of clinker material in the center of the oven tend to receive the least amount of oxygen. As such, lances 310 can be used to direct the oxidizing agents to these areas. In some embodiments, the oxidizing agent directed to the clinker material via the lance has a turbulent flow (e.g., a Reynolds number greater than 4,000) measured at the outlet of the lance. Furthermore, in some embodiments, the oxidizing agent directed to the clinker material may be preheated. In such embodiments, the oxidizing agent exiting the lance is may be within 300° F., 200° F., 100° F. or 50° F. of the oven temperature. Preheating the oxidizing agent can include increasing the residence time of the oxidizing agent in the oven before exiting the lance outlet. For example, the residence time can be increased by coiling the portion of the lance within the oven, e.g., to include two or more turns.

Figure 3B:
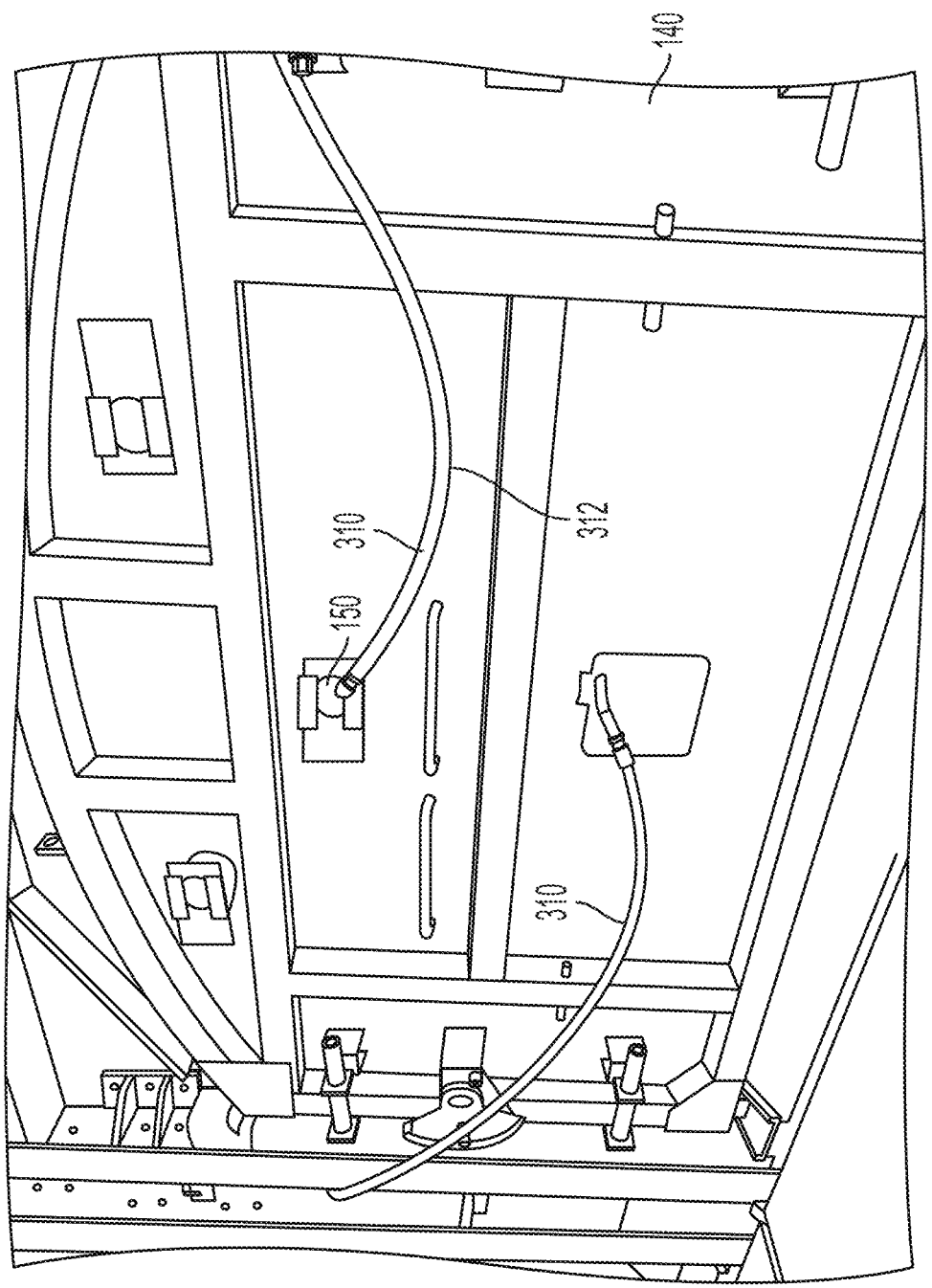
FIG. 3B is an illustration of a coke side door of a coke oven including lances inserted through the coke side door, in accordance with some embodiments.

FIG. 3B is an illustration of a coke side door 140 of a coke oven 100 including lances 310 inserted through the coke side door. As shown in the illustrated embodiment, the lances 310 can comprise a flexible material 312 able to be moved to direct oxidation gas via the lances to particular areas of the coke oven 100

Figure 4:
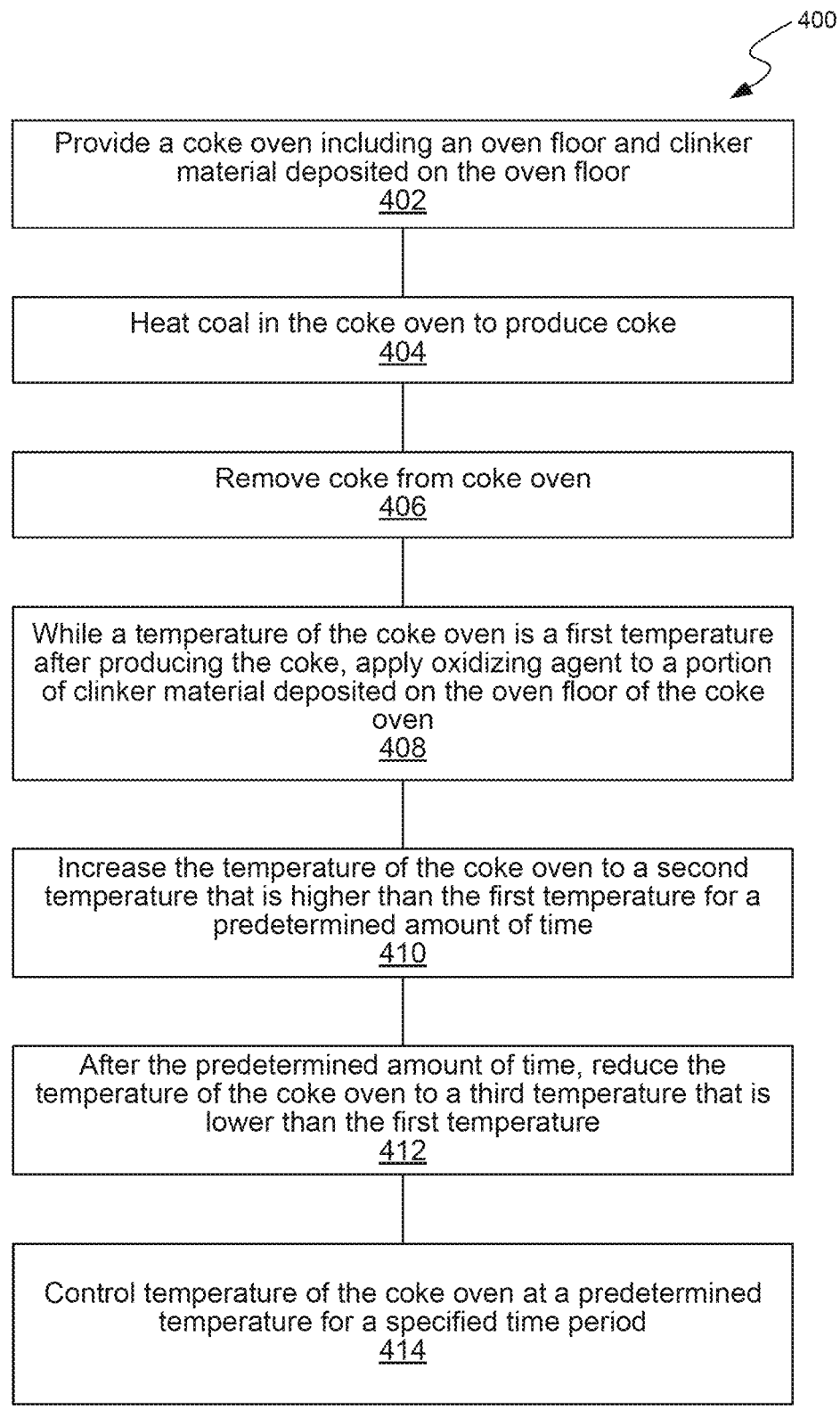
FIG. 4 is a flowchart illustrating a method for removing clinker material from a coke oven, in accordance with some embodiments.

FIG. 4 is a flowchart illustrating a method 400 for removing clinker material from a coke oven, in accordance with embodiments of the present technology. The method 400 can include additional, fewer, or different steps than shown in FIG. 4. Steps of the method 400 can be performed by the controller 305.

As shown in FIG. 4, the method 400 can include providing, at step 402, a coke oven including an oven floor and clinker material deposited on the oven floor. At step 404, coal is heated in the coke oven to produce coke. The coke is removed at step 406. Removing the coke from the coke oven can, for example, include pushing the coke toward a coke side of the coke oven via a pusher ram of a PCM.

After removing the coke from the coke oven, a temperature of the oven is a first temperature. While the temperature of the coke oven is the first temperature, the method 400 can include, at step 408, applying an oxidizing agent to a portion of the clinker material deposited on the oven floor. The oxidizing agent can be directed to the portion of the clinker material by controlling the lance 310 to output the oxidizing agent. In some embodiments, temperature measurements of different areas of the oven are taken, e.g., via the temperature sensors 320, and the lances 310 are adjusted based on the measured temperatures. For example, the lances 310 may be moved to maintain a generally uniform temperature across the oven.

The temperature of the coke oven can then be increased, at step 410, to a second temperature that is higher than the first temperature for a predetermined amount of time. The second temperature may be selected based on thermal limits of various materials in the oven. For example, the second temperature may be a temperature that is less than a failure temperature of the oven floor 120, the crown 130, or other components of the oven. In various embodiments, the second temperature may be less than 2800° F. (measured at or near the oven floor) while being greater than the first temperature at the end of the coking process. The second temperature may be, for example, approximately 2750° F. The oven can be held at the second temperature for a predetermined amount of time. In some embodiments, the predetermined amount of time is an amount of time allowing the materials in the oven reach a steady-state temperature. In other embodiments, the predetermined amount of time is an amount of time less than the time for the materials to reach steady-state. Furthermore, in some embodiments, the temperature of the coke oven is increased at step 410 to the second temperature without applying the oxidizing agent at step 408, or before applying the oxidizing agent. In some cases, the temperature of the oven is increased to the second temperature by directing gas into the oven using the lance 310.

After the predetermined amount of time, the temperature of the coke oven is reduced at step 412 to a third temperature that is lower than the first temperature. The third temperature can be defined based on a range of temperatures where materials in the oven are thermally stable. For example, the oven floor may fail if the temperature falls too low. In this case, the third temperature may be, for example, approximately 1200° F. In some cases, the oven can be cooled to the third temperature by opening one or more dampers in the oven, such as the coke side door, pusher side door, or sole flue. In other cases, to rapidly cool the oven to the third temperature, any combination of air blowers or the lance 310 can be used to blow air into the oven. A cooling agent, such as forced air or a liquid, can be applied to a portion of the clinker material (e.g., via the lance 310) to rapidly cool the clinker material. In some embodiments, while cooling the temperature of the clinker material, a temperature in the sole flue channels can be maintained (e.g., by not opening the sole flue damper 160). The sole flue channels can alternatively be heated while the oven chamber is cooled, applying a greater thermal differential to the clinker material deposited on the oven floor.

The clinker material may have a different coefficient of thermal expansion and/or a different thermal conductivity than components of the oven (such as the oven floor 120), such that the clinker material expands or contracts in response to temperature changes differently than the components of the oven. Thus, by increasing the temperature of the oven at step 410 and cooling the oven at step 412, the method 400 may cause a thermal shock to the clinker material that breaks the clinker material apart for easier removal. Furthermore, independent of the material properties of the clinker material and the oven components, the top of the layer of clinker material changes temperature faster than the floor because heat is conducted to the floor through the clinker material. As the oven temperature is ramped down, for example, the top of the clinker material will cool faster than the floor. This temperature difference can also cause a thermal shock to the clinker material to ease removal of the material. The thermal shock created by heating and cooling the coke oven can cause more of the clinker material to be released compared to if the coke oven was only cooled or only heated. In some embodiments, a similar result can be achieved by first cooling the oven, then heating it. Thus, some embodiments of the method 400 may perform step 412 before step 410. Furthermore, some embodiments of the method 400 may perform multiple heating and cooling cycles to remove the clinker material.

In some embodiments, the method 400 can further include controlling the temperature of the oven at a predetermined temperature for a specified time period (at step 414). The predetermined temperature can be a temperature greater than the first temperature, such as a temperature that is greater than 1800° F. Controlling the temperature of the coke at the predetermined temperature greater than 1800° F. can provide sufficient heat in the coke oven to cause the carbonaceous material of the clinker material to burn off and/or loosen from neighboring portions thereof. For example, the oven temperature can be controlled to burn off clinker material that remains after the physical clinker removal process of steps 410-312. In some embodiments, the predetermined temperature can be greater than about 1900° F., 2000° F., 2100° F., 2200° F., 2300° F. or 2400° F., as measured by one or more of the temperature sensors 420. The time period for which the predetermined temperature is controlled or maintained may be greater than 24 hours, 46 hours, 48 hours, 54 hours, 60 hours, 66 hours, or 72 hours. In some embodiments, the time period is based on a remaining level of the clinker material in the coke oven and is extended until less than a predetermined amount (e.g., 0.5"

of clinker material) remains. In some embodiments, the time period is indefinite (e.g., until the coke oven is used again to produce a batch of coke) to provide a continuous clean of the oven between coking cycles.

Controlling the temperature of the coke oven at step 414 can, in some embodiments, include introducing outside air to the coke oven via openings of the coke oven. For example, as previously described, the coke oven can include multiple dampers, such as on the coke side door, pusher side door, and sole flue. When opened, the dampers allow the ingress of outside air into the coke oven, which is then combusted within the coke oven. In some embodiments, it may be desired to have a small percentage (e.g., 1%) excess oxygen content within the oven. In addition to or in lieu of the foregoing, controlling the temperature of the coke oven can be controlled by increasing or decreasing the amount of British Thermal Units (BTUs) sent to the coke oven. For example, the amount of combustion air directed to the coke oven can be increased or decreased, e.g., via the controller. In some embodiments, the oven temperature can be increased using the lance 310 and decreased by opening one or more of the dampers to introduce outside air into the oven.

In some cases, the carbonaceous or ash materials can be removed at one or more points during the process 400. These materials can be removed by pushing the materials out of the oven using the pusher ram of the PCM. In some embodiments, the carbonaceous or ash materials can be removed after step 412, before controlling the temperature of the oven at an elevated temperature for a period of time to burn off clinker material that remains. In other embodiments, the carbonaceous or ash materials are pushed out of the oven after the clinker is burned off in step 414. In still other embodiments, the pusher ram can be used to push material out of the oven both after step 412 and after step 414.

One or more steps of the process shown in FIG. 4 can be repeated to further increase the amount of clinker material that is removed. For example, in some embodiments, a single cycle of heating the oven from the first temperature to the second temperature, then cooling to the third temperature, can be performed. In other embodiments, the cycle can be repeated two or more times, for example by increasing the temperature from the first temperature to the second temperature, cooling to the third temperature, increasing to the second temperature again, and cooling to the third temperature again. In each cycle, the oven can instead be cooled first to the third temperature before being increased to the second temperature. In still other embodiments, multiple cycles can be performed with a smaller difference between the second and third temperatures. For example, the oven can cycle between a high temperature of approximately 2000 degrees and a low temperature of approximately 1600 degrees, repeating the cycle multiple times to loosen or break apart the clinker material. The oven can be held at each temperature in the cycle for a relatively short period of time (such as a few hours), or for a longer period of time (such as 24 hours or more). Furthermore, some embodiments of the process shown in FIG. 4 can include holding the oven temperature at a sufficiently high temperature to burn off a portion of the clinker material (e.g., as described with respect to step 414), at any point in the temperature cycles. For example, the oven temperature can cycle once to the second temperature and the third temperature before being held at a fourth temperature for a predetermined period of time, then cycled again to the second and third temperatures. As another example, the oven temperature can be cycled multiple times between the second and third temperatures before being controlled at the fourth temperature for a predetermined period of time.

Figure 5:
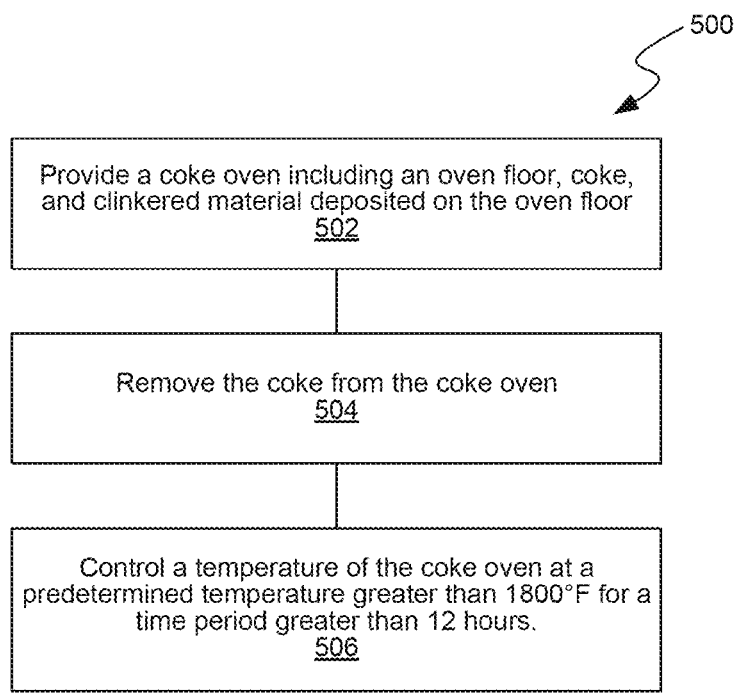
FIG. 5 is a flowchart illustrating another example method for removing clinker material from a coke oven.

FIG. 5 is a flowchart illustrating another example method 500 for removing clinker material from a coke oven. The method 500 includes, at step 502, providing a coke oven including an oven floor, coke, and clinker material deposited on the oven floor. The coke is removed from the coke oven at step 504. At step 506, a temperature of the coke oven is controlled at a predetermined temperature greater than 1800° F. for a time period greater than 12 hours. For example, step 506 can result in burning off and/or loosening clinker material in the oven. Controlling the oven temperature can be performed according to any of the processes described above with respect to FIG. 4.

Figure 6:
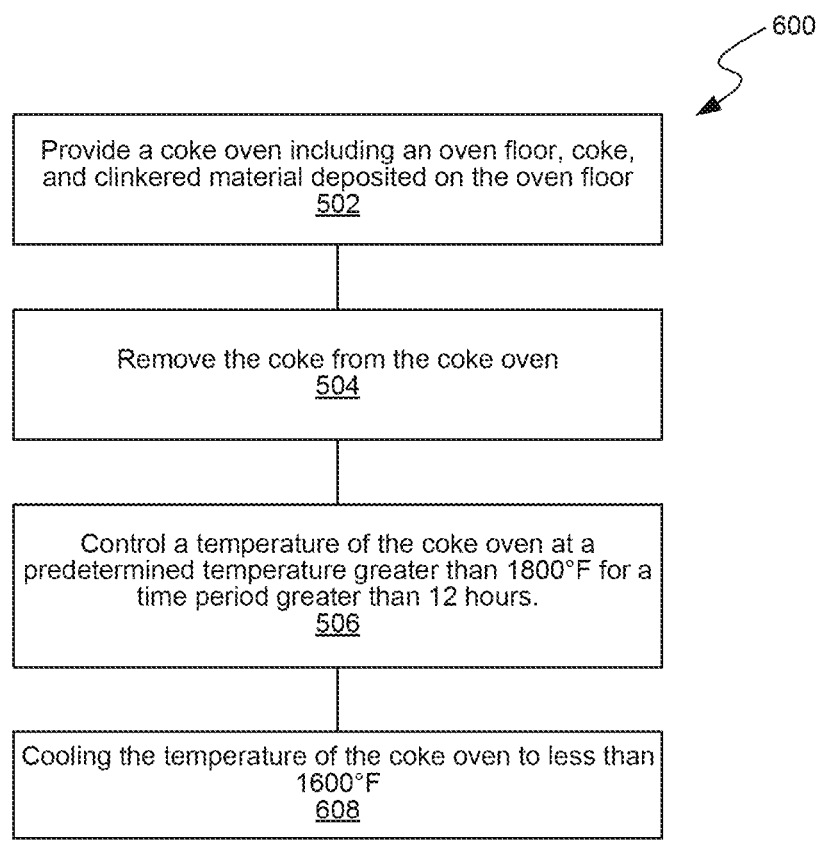
FIG. 6 is a flowchart illustrating still another embodiment of a method 600 for removing clinker material from a coke oven

FIG. 6 is a flowchart illustrating still another embodiment of a method 600 for removing clinker material from a coke oven. The method 600 is similar to method 500 but further includes cooling the temperature of the coke oven to less than 1600° F. (process portion 508), e.g., after controlling the temperature of the coke oven at the predetermined temperature greater than 1800° F. Cooling the temperature of the coke oven can occur "naturally," e.g., by removing all heat sources from the oven and/or by opening one or more dampers of the oven. In some embodiments, cooling of the coke oven is done at a rate greater than a minimum cooling rate. For example, forced air or a liquid can be sprayed on the clinker material to cool the clinker material rapidly. The cooling of the clinker material at a rate greater than the minimum cooling rate can ensure that the clinker material is sufficiently "shocked" and releases from the oven floor. Without being bound by theory, cooling the coke oven at a rate greater than the minimum cooling rate is done to ensure that the clinker material will contract, thereby cracking and releasing from the oven floor. In some embodiments, the coke oven can be cooled to a temperature as low 1400° F., measured at the crown, or 1200° F., measured at the sole flue, without causing damage to the refractory of the oven. Cooling the coke oven may occur over a period of time greater than 12 hours, 24 hours, 30 hours, 36 hours, 42 hours, 48 hours, 54 hours, 60 hours, 66 hours, or 72 hours. Cooling the temperature of the coke oven after or in combination with controlling the temperature of the coke oven at or above 1800° F. can cause more of the clinker material to be released compared to if the coke oven was only cooled without first being heated.

An advantage of the embodiments of the present technology is the ability to treat and remove clinker material using non-mechanical means, such as a pusher ram, or reducing an amount of force needed by the mechanical means to remove the clinker material. By using controlled heating and/or cooling of the oven in accordance with embodiments of the present technology, the clinker material can be burned off via combustion, thereby resulting less risk of damage to the oven floor or sidewalls that often results when using a pusher ram or other mechanical means to forcefully remove the clinker material. Furthermore, by using controlled heating and/or cooling of the oven in accordance with embodiments of the present technology, less damage is caused to the pusher ram and other machine components of the PCM.

Figure 7A:
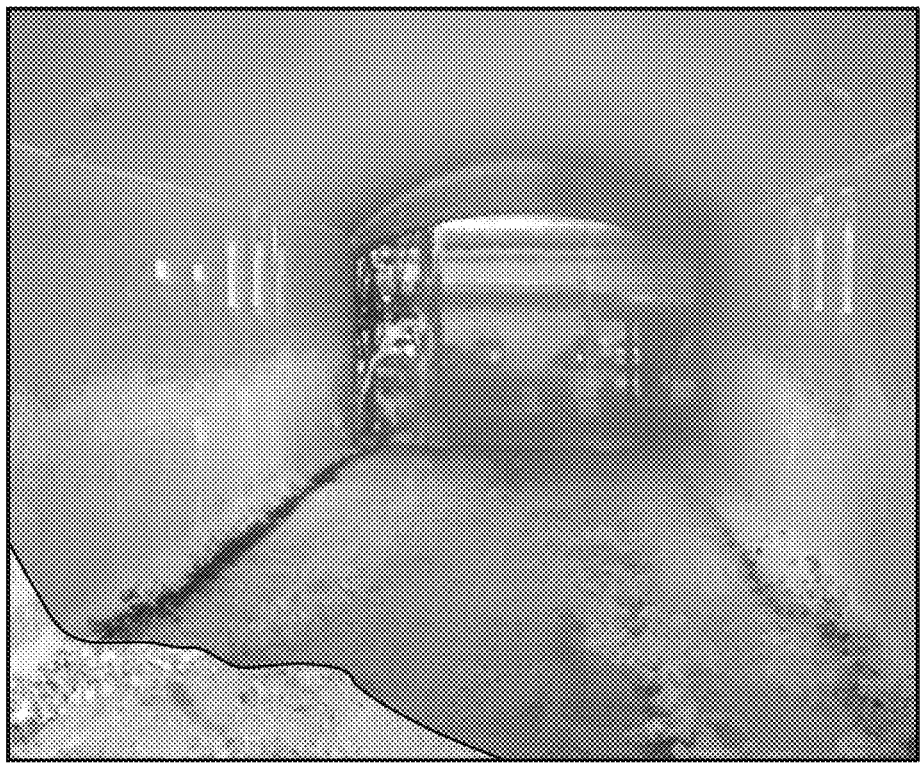
FIG. 7A is an illustration of a coke oven before removing clinker carbonaceous material.
Figure 7B:
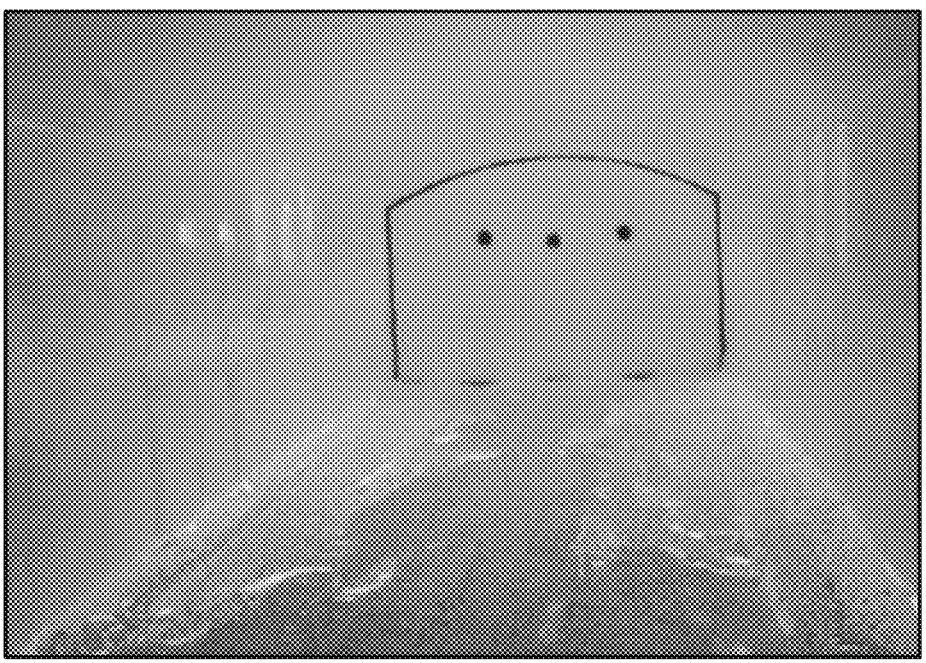
FIG. 7B is an illustration of the coke oven shown in FIG. 7A after clinker carbonaceous material has been removed, in accordance with embodiments of the present technology.

FIG. 7A is an illustration of a coke oven before treating the clinker carbonaceous material with heat, and FIG. 7B is an illustration of the coke oven shown in FIG. 7A after the clinker carbonaceous material has been treated with heat and removed, in accordance with embodiments of the present technology. As shown in the illustration of FIG. 7B, portions of the clinker material present in FIG. 7A were burned off via the treatment and removed.

Specific details of several embodiments of the technology are described below with reference to the Figures. Other details describing well-known structures and systems often associated with pusher systems, charging systems, and coke ovens have not been set forth in the following disclosure to avoid unnecessarily obscuring the description of the various embodiments of the technology. Many of the details, dimensions, angles, spatial orientation and other features shown in the Figures are merely illustrative of particular embodiments of the technology. Accordingly, other embodiments can have other details, dimensions, angles, spatial orientation and features without departing from the spirit or scope of the present technology. A person of ordinary skill in the art, therefore, will accordingly understand that the technology may have other embodiments with additional elements, or the technology may have other embodiments without several of the features shown and described below with reference to the Figures.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the terms "vertical," "horizontal," "lateral," "upper," "lower," "above," and "below" can refer to relative directions or positions of features in the semiconductor devices in view of the orientation shown in the Figures. For example, "upper" or "uppermost" can refer to a feature positioned closer to the top of a page than another feature. These terms, however, should be construed broadly to include semiconductor devices having other orientations, such as inverted or inclined orientations where top/bottom, over/under, above/below, up/down, and left/right can be interchanged depending on the orientation.

From the foregoing, it will be appreciated that specific embodiments of the invention have been described herein for purposes of illustration, but that various modifications may be made without deviating from the scope of the invention. For example, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

We claim:

1. A method for treating carbonaceous material formed over an oven floor of a coke oven, the method comprising:
   providing a coke oven including an oven floor and carbonaceous material deposited on the oven floor, wherein (i) the coke oven is at a first temperature, (ii) the carbonaceous material has a first coefficient of thermal expansion (CTE), and (iii) a material of the oven floor has a second CTE different than the first CTE;
   decreasing the temperature of the coke oven to a second temperature less than the first temperature;
   holding the temperature of the coke oven at the second temperature for a predetermined amount of time;
   after the predetermined amount of time, increasing the temperature of the coke oven to a third temperature higher than the first temperature; and
   removing at least a portion of the carbonaceous material from the coke oven.

2. The method of claim 1, wherein removing at least a portion of the carbonaceous material from the coke oven occurs after increasing the temperature of the coke oven.

3. The method of claim 1, further comprising providing a lance positioned to direct an oxidizing agent toward the oven floor.

4. The method of claim 3, wherein the oxidizing agent comprises air or oxygen.

5. The method of claim 1, wherein the coke oven includes door dampers configured to introduce air into the coke oven, and wherein decreasing the temperature comprises opening one or more of the door dampers.

6. The method of claim 1, wherein decreasing the temperature of the coke oven to the second temperature comprises blowing air into the oven.

7. The method of claim 1, wherein the coke oven includes (i) a sole flue beneath the oven floor and (ii) sole flue dampers configured to introduce air to the sole flue, and wherein decreasing the temperature comprises opening one or more of the sole flue dampers.

8. The method of claim 1, wherein the third temperature is selected based on a lower limit of a thermal stability of silica brick in the coke oven.

9. The method of claim 8, wherein the lower limit of the thermal stability of the silica brick is approximately 1200° F.

10. The method of claim 1, wherein the third temperature is 2750° F. or greater.

11. The method of claim 1, wherein the predetermined amount of time is a first predetermined amount of time, the method further comprising:
    holding the temperature of the coke oven at the third temperature for a second predetermined amount of time; and
    after holding the temperature, decreasing the temperature of the coke oven to a fourth temperature less than the first temperature; and
    holding the temperature of the coke oven at the fourth temperature for a third predetermined period of time.

12. The method of claim 1, wherein decreasing the temperature comprises decreasing the temperature at a first rate and increasing the temperature comprises increasing the temperature at a second rate different than the first rate.

13. A method for treating carbonaceous material formed over an oven floor of a coke oven, the method comprising:
    providing a coke oven including an oven floor, and carbonaceous material deposited on the oven floor, wherein (i) the coke oven is at a first temperature, (ii) the carbonaceous material has a first coefficient of thermal expansion (CTE), and (iii) a material of the oven floor has a second CTE different than the first CTE;

cycling a temperature of the coke oven between a second temperature higher than the first temperature and a first temperature lower than the first temperature, such that a surface of the carbonaceous material contracts and/or expands at a rate differently than that of the material of the coke oven; and removing at least a portion of the carbanaceous material from the coke oven.

14. The method of claim 13, wherein cycling the temperature comprises increasing the temperature of the coke oven from the first temperature to the second temperature and then decreasing the temperature of the coke oven from the second temperature to the third temperature.

15. The method of claim 14, wherein increasing the temperature comprises increasing the temperature at a first rate, and wherein decreasing the temperature comprises decreasing the temperature at a second rate different than the first rate.

16. The method of claim 14, further comprising, after increasing the temperature to the second temperature and before decreasing the temperature to the third temperature, holding the temperature of the coke oven at the second temperature for a predetermined period of time.

17. The method of claim 16, further comprising, after decreasing the temperature to the third temperature, holding the temperature of the coke oven at the third temperature for a predetermined period of time.

18. The method of claim 13, wherein cycling the temperature comprises cycling the temperature between the second temperature and the third temperature at least two times.

19. A system for decarbonizing a coke oven, comprising:
a coke oven including—
an oven floor, sidewalls extending from the oven floor, and a ceiling attached to the sidewalls and extending over the oven floor, and
carbonaceous material covering at least a portion of the oven floor;
a burner coupled to the coke oven and positioned to direct an oxidizing agent toward a chamber of the coke oven;
a temperature sensor configured to measure a temperature in the coke oven; and
a control system coupled to the burner and the temperature sensor and configured to regulate the temperature in the coke oven based at least in part on a signal received from the temperature sensor, the control system being configured to:
increase the temperature of the coke oven from a first temperature to a second temperature higher than the first temperature;
reduce the temperature of the coke oven from the second temperature to a third temperature lower than the first temperature; and
control the temperature of the coke oven substantially at the third temperature for a predetermined period of time.

20. The system of claim 19, wherein the second temperature is between the first temperature and 2200° F., and the third temperature is between the first temperature and 1200° F.

* * * * *

UNITED STATES PATENT AND TRADEMARK OFFICE
CERTIFICATE OF CORRECTION

Page 1 of 5

PATENT NO. : 11,643,602 B2
APPLICATION NO. : 17/321857
DATED : May 9, 2023
INVENTOR(S) : John Francis Quanci et al.

It is certified that error appears in the above-identified patent and that said Letters Patent is hereby corrected as shown below:

On the Title Page

On page 6, Under item (56), Column 2, Line 1, before "U.S. Appl. No. 17/532,058,", insert --U.S. Appl. No. 07/587,742, filed on Sep 25, 1990, now U.S. Pat. No. 5, 114,542, titled Nonrecovery Coke Oven Battery And Method of Operation.
U.S. Appl. No. 07/878,904, filed on May 6, 1992, now U.S. Pat. No. 5,318,671, titled Method Of Operation Of Nonrecovery Coke Oven Battery.
U.S. Appl. No. 09/783, 195, filed on Feb. 14, 2001, now U.S. Pat. No. 6,596, 128, titled Coke Oven Flue Gas Sharing.
U.S. Appl. No. 07/886,804, filed on May 22, 1992, now U.S. Pat. No. 5,228,955, titled High Strength Coke Oven Wall Having Gas Flues Therein.
U.S. Appl. No. 08/059,673, filed on May 12, 1993, now U.S. Pat. No. 5,447,606, titled Method Of And Apparatus For Capturing Coke Oven Charging Emissions.
U.S. Appl. No. 08/914, 140, filed on Aug. 19, 1997, now U.S. Pat. No. 5,928,476, titled Nonrecovery Coke Oven Door.
U.S. Appl. No. 09/680, 187, filed on Oct. 5, 2000, now U.S. Pat. No. 6,290,494, titled Method And Apparatus For Coal Coking.
U.S. Appl. No. 10/933,866, filed on Sep. 3, 2004, now U.S. Pat. No. 7,331 ,298, titled Coke Oven Rotary Wedge Door Latch.
U.S. Appl. No. 11/424,566, filed on Jun. 16, 2006, now U.S. Pat. No. 7,497,930, titled Method And Apparatus For Compacting Coal For A Coal Coking Process.
U.S. Appl. No. 12/405,269, filed on Mar. 17, 2009, now U.S. Pat. No. 7,998,316, titled Flat Push Coke Wet Quenching Apparatus And Process.
U.S. Appl. No. 13/205,960, filed on Aug. 9, 2011, now U.S. Pat. No. 9,321,965, titled Flat Push Coke Wet Quenching Apparatus And Process.
U.S. Appl. No. 11/367,236, filed on Mar. 3, 2006, now U.S. Pat. No. 8,152,970, titled Method And Apparatus For Producing Coke.
U.S. Appl. No. 12/403,391, filed on Mar. 13, 2009, now U.S. Pat. No. 8, 172,930, titled Cleanable In Situ Spark Arrestor.

Signed and Sealed this
Second Day of September, 2025

Coke Morgan Stewart
*Acting Director of the United States Patent and Trademark Office*

CERTIFICATE OF CORRECTION (continued)  
U.S. Pat. No. 11,643,602 B2

U.S. Appl. No. 12/849, 192, filed on Aug. 3, 2010, now U.S. Pat. No. 9,200,225, titled Method And Apparatus For Compacting Coal For A Coal Coking Process.
U.S. Appl. No. 13/631,215, filed on Sep. 28, 2012, now U.S. Pat. No. 9,683,740, titled Methods For Handling Coal Processing Emissions And Associated Systems And Devices.
U.S. Appl. No. 13/730,692, filed on Dec. 28, 2012, now U.S. Pat. No. 9,193,913, titled Reduced Output Rate Coke Oven Operation With Gas Sharing Providing Extended Process Cycle.
U.S. Appl. No. 14/921,723, filed on Oct. 23, 2015, titled Reduced Output Rate Coke Oven Operation With Gas Sharing Providing Extended Process Cycle.
U.S. Appl. No. 14/655,204, now U.S. Pat. No. 10,016,714, filed on Jun. 24, 2015, titled Systems And Methods For Removing Mercury From Emissions.
U.S. Appl. No. 16/000,516, now U.S. Pat. No. 11,117,087, filed on Jun. 5, 2018, titled Systems And Methods For Removing Mercury From Emissions.
U.S. Appl. No. 17/459,380, filed on Jun. 5, 2018, titled Systems And Methods For Removing Mercury From Emissions.
U.S. Appl. No. 13/830,971, filed on Mar. 14, 2013, titled Non-Perpendicular Connections Between Coke Oven Uptakes And A Hot Common Tunnel, And Associated Systems And Methods, now U.S. Pat. No. 10,047,295.
U.S. Appl. No. 16/026,363, filed Jul. 3, 2018, titled Non-Perpendicular Connections Between Coke Oven Uptakes And A Hot Common Tunnel, And Associated Systems And Methods.
U.S. Appl. No. 13/730,796, filed on Dec. 28, 2012, now U.S. Pat. No. 10,883,051, titled Methods And Systems For Improved Coke Quenching.
U.S. Appl. No. 17/140,564 filed Jan. 4, 2021, titled Methods And Systems For Improved Coke Quenching.
U.S. Appl. No. 13/730,598, filed on Dec. 28, 2012, now U.S. Pat. No. 9,238,778, titled Systems And Methods For Improving Quenched Coke Recovery.
U.S. Appl. No. 14/952,267, filed on Nov. 25, 2015, now U.S. Pat. No. 9,862,888, titled Systems And Methods For Improving Quenched Coke Recovery.
U.S. Appl. No. 15/830,320, filed on Dec. 4, 2017, now U.S. Pat. No. 10,323, 192, titled Systems And Methods For Improving Quenched Coke Recovery.
U.S. Appl. No. 13/730,735, filed on Dec. 28, 2012, now U.S. Pat. No, 9,273,249, titled Systems And Methods For Controlling Air Distribution In A Coke Oven.
U.S. Appl. No. 14/655,013, filed on Jun. 23, 2015, now U.S. Pat. No. 11,142,699, titled Vent Stack Lids And Associated Systems And Methods.
U.S. Appl. No. 17/471,491, filed on Sep. 10, 2021, now U.S. Pat. No. 11,142,699, titled Vent Stack Lids And Associated Systems And Methods.
U.S. Appl. No. 13/843, 166, now U.S. Pat. No. 9,273,250, filed on Mar. 15, 2013, titled Methods And Systems For Improved Quench Tower Design.
U.S. Appl. No. 15/014,547, filed on Feb. 3, 2016, now, U.S. Pat. No. 10,927,303, titled Methods For Improved Quench Tower Design.
U.S. Appl. No. 17/155,818, filed on Jan. 22, 2021, titled Methods And Systems For Improved Quench Tower Design.
U.S. Appl. No. 14/655,003, filed on Jun. 23, 2015, titled Systems And Methods For Maintaining A Hot Car In A Coke Plant.
U.S. Appl. No. 16/897,957, filed Jun. 10, 2020, titled Systems And Methods For Maintaining A Hot Car In A Coke Plant.

CERTIFICATE OF CORRECTION (continued)
U.S. Pat. No. 11,643,602 B2

U.S. Appl. No. 13/829,588, now U.S. Pat. No. 9,193,915, filed on Mar. 14, 2013, titled Horizontal Heat Recovery Coke Ovens Having Monolith Crowns.
U.S. Appl. No. 15/322, 176, filed on Dec. 27, 2016, now U.S. Pat. No. 10,526,541, titled Horizontal Heat Recovery Coke Ovens Having Monolith Crowns.
U.S. Appl. No. 15/511,036, filed on Mar. 14, 2017, now U.S. Pat. No. 10,968,383, titled Coke Ovens Having Monolith Component Construction.
U.S. Appl. No. 16/704,689, filed Dec. 5, 2019, titled Horizontal Heat Recovery Coke Ovens Having Monolith Crowns.
U.S. Appl. No. 17,190,720, filed on Mar. 3, 2021, titled Coke Ovens Having Monolith Component Construction.
U.S. Appl. No. 13/589,009, filed on Aug. 17, 2012, titled Automatic Draft Control System For Coke Plants
U.S. Appl. No. 15/139,568, filed Apr. 27, 2016, now U.S. Pat. No. 10,947,455, titled Automatic Draft Control System For Coke Plants.
U.S. Appl. No. 17/176,391, filed Feb. 16, 2021, titled Automatic Draft Control System For Coke Plants.
U.S. Appl. No. 13/588,996, now U.S. Pat. No. 9,243, 186, filed on Aug. 17, 2012, titled Coke Plant Including Exhaust Gas Sharing.
U.S. Appl. No. 14/959,450, filed on Dec. 4, 2015, now U.S. Pat. No. 10,041,002, titled Coke Plant Including Exhaust Gas Sharing.
U.S. Appl. No. 16/047, 198, filed on Jul. 27, 2018, now U.S. Pat. No. 10,611,965, titled Coke Plant Including Exhaust Gas Sharing.
U.S. Appl. No. 16/828,448, filed on Mar. 24, 2020, titled Coke Plant Including Exhaust Gas Sharing.
U.S. Appl. No. 13/589,004, now U.S. Pat. No. 9,249,357, filed on Aug. 17, 2012, titled Method And Apparatus For Volatile Matter Sharing In Stamp-Charged Coke Ovens.
U.S. Appl. No. 13/730,673, filed on Dec. 28, 2012, titled Exhaust Flow Modifier, Duct Intersection Incorporating The Same, And Methods Therefor.
U.S. Appl. No. 15/281,891, filed on Sep. 30, 2016, now U.S. Pat. No. 10,975,309, titled Exhaust Flow Modifier, Duck Intersection Incorporating The Same, And Methods Therefor.
U.S. Appl. No. 17/191,119, filed on Mar. 3, 3021, titled Exhaust Flow Modifier, Duck Intersection Incorporating The Same, And Methods Therefor.
U.S. Appl. No. 13/598,394, now U.S. Pat. No. 9,169,439, filed on Aug. 29, 2012, titled Method And Apparatus For Testing Coal Coking Properties.
U.S. Appl. No. 14/865,581, filed on Sep. 25, 2015, now U.S. Pat. No. 10,053,627, titled Method And Apparatus For Testing Coal Coking Properties.
U.S. Appl. No. 14/839,384, filed on Aug. 28, 2015, titled Coke Oven Charging System.
U.S. Appl. No. 15/443,246, now U.S. Pat. No. 9,976,089, filed on Feb. 27, 2017, titled Coke Oven Charging System.
U.S. Appl. No. 14/587,670, filed on Dec. 31, 2014, now U.S. Pat. No. 10,619, 101, titled Methods For Decarbonizing Coking Ovens, And Associated Systems And Devices.
U.S. Appl. No. 16/845,530, filed on Apr. 10, 2020, titled Methods For Decarbonizing Coking Ovens, And Associated Systems And Devices.
U.S. Appl. No. 14/984,489, filed on Dec. 30, 2015, now U.S. Pat. No. 10,975,310, titled Multi-Modal Beds Of Coking Material.
U.S. Appl. No. 14/983,837, filed on Dec. 30, 2015, now U.S. Pat. No. 10,968,395, titled Multi-Modal Beds Of Coking Material.

CERTIFICATE OF CORRECTION (continued)
U.S. Pat. No. 11,643,602 B2

U.S. Appl. No. 14/986,281, filed on Dec. 31, 2015, now U.S. Pat. No. 10,975,311, titled Multi-Modal Beds Of Coking Material.
U.S. Appl. No. 17,222,886, filed on Apr. 12, 2021, titled Multi-Modal Beds Of Coking Material.
U.S. Appl. No. 14/987,625, filed on Jan. 4, 2016, now U.S. Pat. No. 11,060,032, titled Integrated Coke Plant Automation And Optimization Using Advanced Control And Optimization Techniques.
U.S. Appl. No. 17/172,476, filed on Feb. 10, 2021, titled Integrated Coke Plant Automation And Optimization Using Advanced Control And Optimization Techniques.
U.S. Appl. No. 14/839,493, filed on Aug. 28, 2015, now U.S. Pat. No. 10,233,392, titled Method And System For Optimizing Coke Plant Operation And Output.
U.S. Appl. No. 16/251,352, filed on Jan. 18, 2019, now U.S. Pat. No. 11,053,444, titled Method And System For Optimizing Coke Plant Operation And Output.
U.S. Appl. No. 17/363,701, filed on Jun. 30, 2021, titled Method And System For Optimizing Coke Plant Operation And Output.
U.S. Appl. No. 14/839,551, filed Aug. 28, 2015, now U.S. Pat. No. 10,308,876, titled Burn Profiles For Coke Operations.
U.S. Appl. No. 16/428,014, filed May 31, 2019, now U.S. Pat. No. 10,920, 148, titled Improved Burn Profiles For Coke Operations.
U.S. Appl. No. 17/155,219, filed Jan. 22, 2021, titled Improved Burn Profiles For Coke Operations.
U.S. Appl. No. 14/839,588, filed Aug. 28, 2015, now U.S. Pat. No. 9,708,542, titled Method And System For Optimizing Coke Plant Operation And Output.
U.S. Appl. No. 15/392,942, filed Dec. 28, 2016, now U.S. Pat. No. 10,526,542, titled Method And System For Dynamically Charging A Coke Oven.
U.S. Appl. No. 16/735, 103, now U.S. Pat. No. 11,214,739, filed Jan. 6, 2020, titled Method And System For Dynamically Charging A Coke Oven.
U.S. Appl. No. 17/526,477, filed Jan. 6, 2020, titled Method And System For Dynamically Charging A Coke Oven.
U.S. Appl. No. 15/614,525, filed Jun. 5, 2017, titled Methods And Systems For Automatically Generating A Remedial Action In An Industrial Facility.
U.S. Appl. No. 15/987,860, filed on May 23, 2018, now U.S. Pat. No. 10,851,306, titled System And Method For Repairing A Coke Oven.
U.S. Appl. No. 17/076,563, filed on Oct. 21, 2020, now U.S. Pat. No. 11, 186,778, titled System And Method For Repairing A Coke Oven.
U.S. Appl. No. 17/521,061, filed on Nov. 8, 2021, titled System And Method For Repairing A Coke Oven.
U.S. Appl. No. 17/135,483, filed on Dec. 28, 2020, titled Oven Health Optimization Systems And Methods.
U.S. Appl. No. 16/729,053, filed on Dec. 27, 2019, titled Oven Uptakes.
U.S. Appl. No. 16/729,036, filed on Dec. 27, 2019, titled Systems And Methods For Treating A Surface Of A Coke Plant
U.S. Appl. No. 16/729,201, filed on Dec. 27, 2019, titled Gaseous Tracer Leak Detection.
U.S. Appl. No. 16/729, 122, filed on Dec. 27, 2019, titled Methods And Systems For Providing Corrosion Resistant Surfaces In Contaminant Treatment Systems.
U.S. Appl. No. 16/729,068, filed on Dec. 27, 2019, titled Systems And Methods For Utilizing Flue Gas.
U.S. Appl. No. 16/729, 129, filed on Dec. 27, 2019, now U.S. Pat. No. 11,008,518, titled Coke Plant Tunnel Repair And Flexible Joints.

U.S. Appl. No. 17/320,343, filed on May 14, 2021, titled Coke Plant Tunnel Repair And Flexible Joints.
U.S. Appl. No. 16/729, 170, now U.S. Pat. No. 11, 193,069, filed on Dec. 27, 2019, titled Coke Plant Tunnel Repair And Anchor Distribution.¶--

On page 7, Column 2, Line 42, delete "Reort" and insert --Report-- therefor.

In the Specification

In Column 8, Line 19, delete "508)," and insert --608),-- therefor.